United States Patent [19]
Wang et al.

[11] Patent Number: 5,799,207
[45] Date of Patent: Aug. 25, 1998

[54] NON-BLOCKING PERIPHERAL ACCESS ARCHITECTURE HAVING A REGISTER CONFIGURE TO INDICATE A PATH SELECTION FOR DATA TRANSFER BETWEEN A MASTER, MEMORY, AND AN I/O DEVICE

[75] Inventors: Shih-Chieh Wang; Wei-Wen Chang, both of Taipei; Zen-Dar Hsu, Hsinchu, all of Taiwan

[73] Assignee: Industrial Technology Research Institute, Hsinchu, Taiwan

[21] Appl. No.: 413,807

[22] Filed: Mar. 28, 1995

[51] Int. Cl.$^6$ ............................................. G06F 13/00
[52] U.S. Cl. .................... 395/858; 395/287; 395/308; 395/309; 395/849; 370/351; 370/364
[58] Field of Search ............................ 370/85.1, 364; 395/281, 304, 308, 821, 842, 200.03, 200.07, 310, 800.15, 826, 287, 309, 858, 849

[56] References Cited

U.S. PATENT DOCUMENTS

| | | | |
|---|---|---|---|
| 3,675,209 | 7/1972 | Trost et al. | 395/825 |
| 3,725,864 | 4/1973 | Clark et al. | 395/826 |
| 4,050,058 | 9/1977 | Garlic | 395/800.42 |
| 4,535,448 | 8/1985 | Baxter et al. | 370/364 |
| 4,564,900 | 1/1986 | Smitt | 395/200.07 |
| 4,648,068 | 3/1987 | Ninnemann et al. | 395/281 |
| 4,916,692 | 4/1990 | Clarke et al. | 370/85.1 |
| 4,979,097 | 12/1990 | Triolo et al. | 395/200.83 |
| 5,131,081 | 7/1992 | MacKenna et al. | 395/842 |
| 5,142,672 | 8/1992 | Johnson et al. | 395/500 |
| 5,168,572 | 12/1992 | Perkins | 395/800.15 |
| 5,191,657 | 3/1993 | Ludwig et al. | 395/325 |
| 5,212,776 | 5/1993 | Zandveld et al. | 395/325 |
| 5,367,646 | 11/1994 | Pardillos et al. | 395/310 |
| 5,379,384 | 1/1995 | Solomon | 395/308 |
| 5,490,253 | 2/1996 | Laha et al. | 395/304 |
| 5,499,341 | 3/1996 | Wilson et al. | 395/200.03 |
| 5,499,346 | 3/1996 | Amini et al. | 395/308 |
| 5,499,384 | 3/1996 | Lentz et al. | 395/821 |
| 5,509,127 | 4/1996 | Datwyler et al. | 395/308 |

Primary Examiner—Thomas C. Lee
Assistant Examiner—Po C. Huang
Attorney, Agent, or Firm—Meltzer, Lippe, Goldstein, et al.

[57] ABSTRACT

A computer system is disclosed which has a master, such as a processor, a memory, and I/O device, a first transfer path, which includes a bus, and a second transfer path, which includes a transfer interconnection. Transfers between the memory and the I/O device are effected via the first path while transfers between the processor and the I/O device are transferred via the second path. The disparate treatment between these two types of transfers reduces the likelihood that the transfer via the second path is delayed and thereby reduces the likelihood that the master is totally blocked from operation.

24 Claims, 11 Drawing Sheets

READ CONFIGURATION

WRITE CONFIGURATION

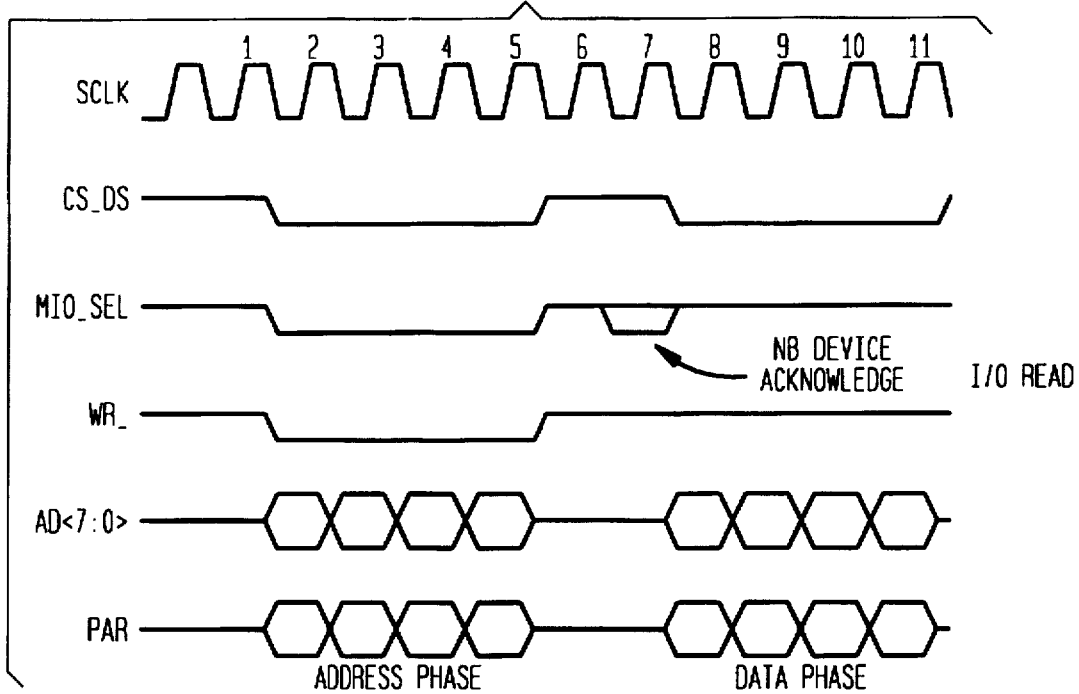
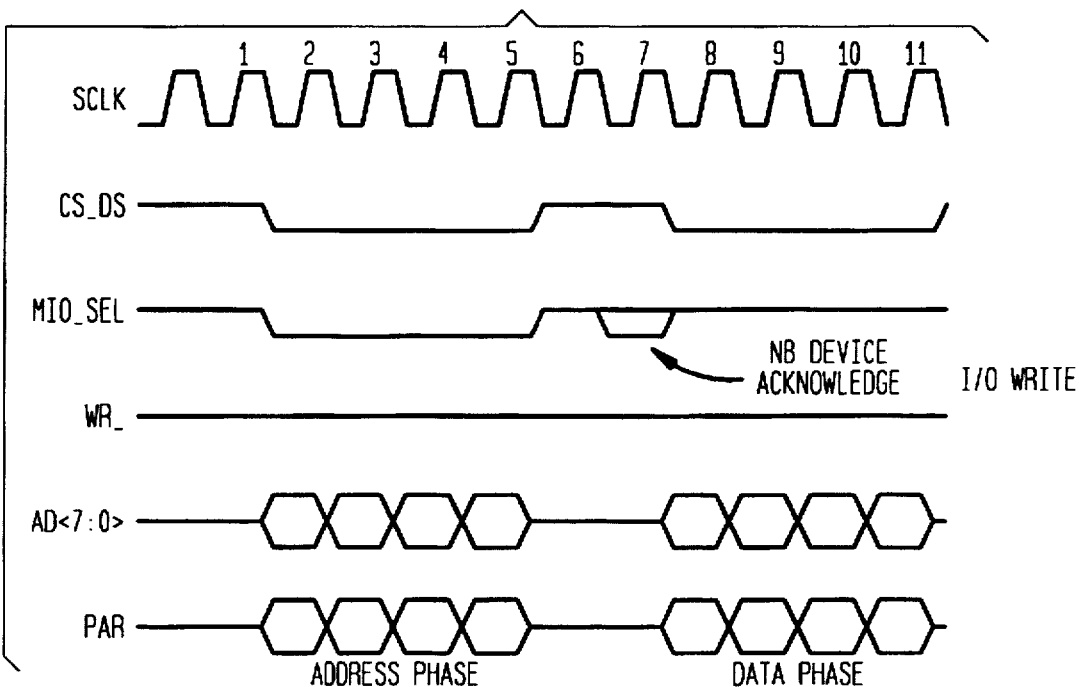

NON-BLOCKING PERIPHERAL ACCESS ARCHITECTURE HAVING A REGISTER CONFIGURE TO INDICATE A PATH SELECTION FOR DATA TRANSFER BETWEEN A MASTER, MEMORY, AND AN I/O DEVICE

RELATED APPLICATIONS:

The following patent applications are assigned to the assignee hereof and contain subject matter which is related to the subject matter of this application:

(1) U.S. patent application Ser. No. 08/071,721, now abandoned, entitled "Memory Consistent Preownership Method and System for Transferring Data Between an I/O Device and a Main Memory," filed for Chang-Lun Chen, Allen S. C. Wang, and Wei-Wen Chang on Jun. 4, 1993;

(2) U.S. patent application Ser. No. 08/321,205, now U.S. Pat. No. 5,615,334, entitled "Efficient Fault Tolerant Memory Consistent Reflection Scheme," filed for Shih-Chieh Wang, Wei-Wen Chang, and Lu-Ping Chen on Oct. 7, 1994; and (3) U.S. patent application Ser. No. 08/320,520, now U.S. Pat. No. 5,659,707, entitled "Transfer Labelling Mechanism for Multiple Outstanding Read Requests on a Split Transaction Bus," filed for Shih-Chieh Wang, Kang-Wei Chang, and Jiahn-Jung Chen on Oct. 7, 1994.

The contents of the above-listed patent applications are incorporated herein by reference.

FIELD OF THE INVENTION

The present invention is related to transferring information between I/O devices and a shared memory on the one hand and between the I/O devices and a master, such as a CPU or processor, on the other hand. The present invention treats the transfer of information between an I/O device and the processor separately from the transfer of data between an I/O device and the shared memory and provides a novel architecture with separate busses for each type of transfer.

BACKGROUND OF THE INVENTION

FIG. 1 shows a computer system 10. The computer system 10 has one or more CPUs or processors 11-1, 11-2, . . . , 11-n, each CPU having a corresponding cache memory 13-1, 13-2, . . . , 13-n, a shared memory 14, and an I/O bridge 18 connected to a system bus 16. The function of each of these devices in the computer system 10 is described below.

The system bus is for transferring data, addresses, and commands between the devices, i.e., the processors 11-1 to 11-n, the shared memory 14, and the I/O bridge 18, connected thereto. The system bus 16 is a shared resource; each of the devices attempts to utilize the system bus at one time or another for purposes of transferring data, addresses, or commands. Sometimes, more than one device contend to utilize the system bus 16 at the same time. However, only a limited number of devices illustratively can utilize the system bus 16 at one time. To resolve this contention, the computer system 10 is provided with an elaborate arbitration protocol for allocating the system bus 16, in a fair and orderly manner, to each device contending to use it.

Each processor 11-1, 11-2, . . . , 11-n is for executing instructions, such as arithmetic or logical operations on data, program flow control instructions for ordering the execution of other instructions, memory access commands, and I/O device access commands. Memory access commands include commands for reading and writing data. For example, the processor 11-1 can write data into the shared memory 14 or cache memory 13-1 or read data from, the shared memory 14 or cache memory 13-1. I/O device accesses are discussed in greater detail below.

The system 10 is designed so that each of the processors 11-1 to 11-n can execute a number of processes simultaneously. Furthermore, each individual processor 11-1 to 11-n is capable of "multi-tasking." Multi-tasking refers to the ability of a processor to execute a number of separate processes contemporaneously. According to a multi-tasking execution scheme, a processor, such as the processor 11-1, alternately executes several instructions of each of a plurality of processes during a particular time interval. Thus, the execution cycles of the processor 11-1 over an interval of time are allocated to each of the executing processes. Because the processor executes at a high speed, and because the processor (typically) rapidly switches between executing each process, the user has the impression that all processes contemporaneously executing on that particular processor are executing simultaneously, albeit, possibly slower.

The shared memory 14 includes an array of storage locations for storing fixed length data, e.g., eight bit long or byte long data, for later retrieval. Each storage location has an unique address which identifies the particular storage location. A particular storage location in the shared memory can be accessed, i.e., for purposes of writing data into, or reading data from, the addressed storage location by issuing a command to the shared memory which command includes the corresponding address.

Typically, the shared memory 14 is formed from a number of relatively inexpensive dynamic random access memory circuits or DRAMs. This is advantageous to maximize the storage space of the shared memory 14 (by providing a shared memory 14 with many DRAMs) for a given cost. However, such inexpensive DRAMs tend to require a relatively long access time. For example, a typical DRAM requires 80 ns (12.5 MHz transfer rate) to write data into, or read data from, a particular location of the memory array. This is substantially slower than the transfer rate of the memory bus (which can be as high as 33 MHz) and much slower than the clock speed of the processors 11-1 to 11-n (which can be as high as 100 MHz in a 80486 DX4™ microprocessor manufactured by Intel Corp.) Thus, if a particular processor, e.g., the processor 11-2, must access the shared memory periodically, e.g., to obtain program instructions, the processor 11-2 will be idle for a substantial portion of the time while the processor 11-2 waits to receive data from the shared memory 14. This reduces the efficiency and operating speed of the computer system 10.

The cache memories 13-1 to 13-n are provided to remedy this problem. The cache memories 13-1 to 13-n are a small, high speed memory which can maintain a duplicate copy of part of the data stored in the shared memory 14. Despite its relatively small size in comparison to the shared memory 14, the cache memories 13-1 to 13-n dramatically reduce the number of memory access to the shared memory 14. This is because the cache memories 13-1 to 13-n exploit the spatial and temporal locality of reference properties of processor memory accesses, i.e., the tendency of the processors 11-1 to 11-n to access data in addresses adjacent to previously accessed data and to repeatedly access the same data.

The cache memories 13-1 to 13-n which are external to the processors 11-1 to 11-n are typically formed from static random access memory circuits or SRAMs.

The I/O bridge 18 is connected to the system bus 16 and to an I/O expansion bus 20. At least one I/O device 22-1, 22-2, ..., 22-m is also connected to the I/O expansion bus. Such I/O devices 22-1, 22-2, ..., 22-m may be any type of interface or controller and associated connected peripheral device, such as a network interface and network, a disk drive controller and disk drive, a printer interface and printer, a graphics display adapter and display device, etc.

The purpose of the I/O bridge 18 is to "decouple" the system bus 16 from the I/O expansion bus 20. Typically data is transmitted in different formats and at different speeds on these two busses 16 and 20. For instance, data may be transmitted in thirty two byte packets on the system bus 16 at 33 MHz. According to one type of I/O expansion bus architecture, called "Extended Industry Standard Architecture" or EISA, data is transmitted in four byte groups at 8 MHz thereon. According to a second type of I/O expansion bus architecture, called "Peripheral Component Interconnect" or PCI, data is also transmitted in four byte groups at 33 MHz, and can be transmitted in multiple cycle bursts to transfer a maximum amount of data at one time. The I/O devices 22-1 to 22-m can "convert" data received according to one bus transfer protocol for transfer on the other bus according to a second bus transfer protocol. For instance, the I/O bridge 18 can receive data packets transferred thereto from a source device, e.g., the processor 11-1, via the system bus 16 and temporarily store the data of these packets therein. The I/O bridge 18 then transfers the received, "depacketized" data in four byte groups to the appropriate destination I/O device, e.g., the I/O device 22-2, via the I/O expansion bus 20. Likewise, the I/O bridge 18 may receive and temporarily store data transferred thereto from a source I/O device, such as the I/O device 22-1, via the I/O expansion bus 20. The I/O bridge 18 then transfers the received data in packets to the appropriate destination device, e.g., the shared memory 14, via the system bus 16.

The above-discussion is intended to provide a basic framework understanding of the computer system 10. The discussion below describes in greater detail two types of transfers which may be performed in the computer system 10. These transfers are:

(1) transfers between an I/O device, e.g., the I/O device 22-1, and a memory, e.g., the shared memory 14; and (2) transfers between a processor, e.g., the processor 11-1, and an I/O device, e.g., the I/O device 22-1.

First, the transfers between the I/O device 22-1 and the shared memory 14 are described. Most I/O devices 22-1 to 22-m utilize the "direct memory access (DMA)" paradigm for transferring data to and from the shared memory 14. An I/O device, e.g., the I/O device 22-1, operating according to DMA transfers data between the I/O device 22-1 and the shared memory 14 via a data path which does not include any of the processors 11-1 to 11-n. DMA is best illustrated in comparison to an I/O device, e.g., the I/O device 22-2, which does not use DMA. An example of such a non-DMA I/O device 22-2 is a graphics controller I/O device 22-2 (although the trend is for future graphics controller I/O devices 22-2 to also utilize DMA). Data is transferred between the graphics controller I/O device 22-2 and the shared memory 14 using the following path:

graphics controller I/O device 22-2←→I/O expansion bus 20←→I/O bridge 18←→system bus 16←→processor 11-1←→system bus 16←→shared memory 14.

(In the path shown above, the selection of the processor 11-1 is illustrative; any processor 11-1 to 11-n may be utilized). As shown, the transfer requires that the data flow through a processor, e.g., the processor 11-1, which processor controls the transfer of data.

The device which controls the transfer is often referred to as a "master." The master issues transfer commands to other devices, referred to as "slaves," to effect the transfer. In the transfer described above, the processor 11-1 is the master and the shared memory 14 and I/O device 22-2 are the slaves.

Data is transferred between the DMA I/O device 22-2 and the shared memory 14 using the following path:

DMA I/O device 22-2←→I/O expansion bus←→I/O bridge 18←→system bus 16←→shared memory 14. As shown, fewer transfers on the system bus 16 are necessary, thereby reducing the likelihood of contention thereon. Furthermore, the DMA I/O device 22-1 serves as the master for this transfer (with the shared memory 14 as the slave). Thus, no processors 11-1 to 11-n are needed to effect the transfer, thereby avoiding the need to interrupt a processor from executing instructions of processes.

Next, the transfers between a processor, e.g., the processor 11-1, and an I/O device, e.g., the I/O device 11-1 are described. In such transfers, the processor 11-1 is the master. FIGS. 2-3 illustrate timing diagrams which are useful in illustrating transfer operations between the processors 11-1 to 11-n and the I/O devices 22-1 to 22-m on a PCI I/O expansion bus 20. These timing diagrams illustrate the following signals which are transferred on corresponding signal lines:

| | |
|---|---|
| PCICLK | A clock signal for synchronizing the operation of, and the transmission of all other signals on, the PCI I/O bus 20. |
| FRAME_ | A signal indicating the proceeding of a PCI transaction. |
| IRDY_ | A signal indicating an I/O master device is ready to receive data (read) or has transmitted data in the PCI bus (write). |
| TRDY_ | A signal indicating that an I/O slave device is simultaneously transferring/receiving data via AD<31:0> discussed below. In the absence of this signal, the AD<31:0> signal is ignored by the I/O bridge 18. |
| DEVSEL_ | A signal transmitted by one of the I/O devices 22-1 to 22-m to the I/O bridge 18 indicating that a selected I/O device has received a command. |
| AD<31:0> | A 32-bit wide signal which is transmitted by the I/O bridge 18 of one of the I/O devices 22-1 to 22-m for purposes of transferring addresses, commands, and data. |
| IDSEL | A signal asserted by the I/O bridge 18 to an I/O device to indicate that a configuration cycle is currently being transmitted to that I/O device. |
| SERR_ | A signal indicating that an error has occurred, e.g., the I/O device 22-1, is malfunctioning or not responding correctly or when it is supposed to. |

PCI I/O devices 22-1 to 22-m (I/O devices which can connect to, and utilize, a PCI I/O expansion bus 20) differ from ordinary I/O devices. First, PCI device I/O devices 22-1 to 22-m are not fixed in any specific address space, but rather are relocatable in the address space. This means that each PCI I/O device can be programmed to decide which address(es) it should respond to, rather than being hard-wired to respond to fixed address(es). Second, all PCI I/O devices 22-1 to 22-m include a configuration space header which defines the configuration and capabilities of the PCI I/O device 22-1 to 22-m. Each PCI I/O device 22-1 includes six 32-bit registers for storing addresses indicating the locations of relocated portions of memory address mapped areas or I/O address mapped areas. Memory address mapped areas are memory type access cycles with addresses, portions (bounded by registers) to which the I/O device must respond. For example, memory address mapped areas may be provided for frame buffer memory spaces for graphic display cards or subsystems. I/O address mapped areas, on the other hand, are I/O type access cycles with address portions (bounded by registers) to which the I/O device must respond. In order to change any configuration, it is necessary for a processor 11-1 to 11-n to write appropriate information in the correct configuration register of the PCI I/O device 22-1 to 22-m. Likewise, the processor 11-1 to 11-n might issue a command to the PCI I/O device 22-1 to 22-m to determine configuration information contained in such registers. The PCI I/O device 22-1 to 22-m responds by returning the requested data.

FIG. 2 illustrates the issuance of a command, in particular, a configuration read cycle, originating from a processor, e.g., the processor 11-1, and destined to an I/O device, e.g., the I/O device 22-1, via the I/O expansion bus 20. Prior to PCICLK cycle two, the processor 11-1 transfers an appropriate command to the I/O bridge 18 via the system bus 16 destined to the PCI I/O device 22-1. On PCICLK cycle two, the I/O bridge 18 generates a high IDSEL signal of duration one clock and an AD<31:0> signal. The AD<31:0> signal includes a single one of the bits in the upper two bytes AD<31:16> set to logic '1'. The particular bit which is set to logic '1' corresponds to the I/O device 22-1 and serves as an identification therefor. In addition, the I/O bridge 18 transmits a low FRAME__signal on PCICLK cycles two-three. Furthermore, the I/O bridge 18 transmits a low IRDY__signal to indicate that it is ready to receive a response to the last issued command.

These signals are received at the PCI I/O device 22-1 which determines that the command was destined thereto by virtue of the appropriate bit of AD<31:16> corresponding to the I/O device 22-1 being set to logic '1'. In response, the PCI I/O device 22-1 transmits on PCICLK cycles four and five a low DEVSEL__signal to indicate to the I/O bridge 18 that the previously transmitted command has been received. On PCICLK cycle five, the PCI I/O device transmits a signal AD<31:0> indicative of the contents of a particular register thereof (which particular register was designated by the lower two bytes AD<15:0> of the received command) and a low TRDY__signal indicating that valid data is being transferred via the signal AD<31:0>. In response to these signals, the I/O bridge 18 receives the data indicated by the signal AD<31:0> transmitted from the PCI I/O device 22-1. This data is then transferred to the processor 11-1 via the system bus 16.

FIG. 3 illustrates a situation in which a configuration read command is transferred via the PCI I/O expansion bus 20 in a similar fashion as in FIG. 2. That is, the processor 11-1 transfers a command to the I/O bridge 18 prior to PCICLK cycle two and the I/O bridge 18 transmits the FRAME__, AD<31:0> and IDSEL signals as described above. Furthermore, a three clock IRDY__signal is transmitted on clocks four-six. However, no I/O device 22-1 to 22-m responds to the command. This is the indication of an error which may have arisen because the appropriate identifying bit was not set in the upper two bytes AD<31:16> of the command or because the PCI I/O device 22-1 is malfunctioning. Illustratively, if the I/O bridge 18 does not detect the DEVSEL__signal within a certain number of clocks after transmitting the IDSEL signal, the I/O bridge 18 ceases transmitting the IRDY__signal. Thereafter, the I/O bridge may issue a system wide alarm by transmitting a low SERR__signal on PCICLK cycle seven.

It is worthy to study different processing delay scenarios which can occur in the two types of transfers described above. In a first scenario, the processor 11-1 is executing a process which requires a data transfer between the shared memory 14 and a DMA I/O device 22-1. As discussed above, the data transfer is controlled by the DMA I/O device 22-1 and requires no assistance or interaction with the processor 11-1. Suppose that before the transfer begins one or more resources necessary to perform the transfer (i.e., the shared memory 14, the system bus 16, the I/O bridge 18, or the I/O expansion bus 20) is currently busy servicing another transfer. Alternatively, after the transfer begins, but before the transfer completes, one or more of the necessary resources must be released to service another transfer. In either case, the performance of the transfer will be delayed until the necessary resources are available. While this situation can also delay the execution of the current process which requires that the transfer complete, it does not entirely block execution in the processor 11-1. Rather, the processor 11-1 may temporarily suspend executing the current process until the transfer has completed and instead execute any other available process.

Consider now a second scenario wherein the processor 11-1 is executing a process which requires a transfer between the processor 11-1 and the I/O device 22-1. For example, the processor 11-1 may be required to issue a command to the I/O device, or receive a response therefrom, or both, as described above. Again, suppose that before the transfer begins, one or more resources necessary to perform the transfer (i.e., the shared memory 14, the system bus 16, the I/O bridge 18, or the I/O expansion bus 20) is currently busy servicing another transfer. Alternatively, after the transfer begins, but before the transfer completes, one or more of the necessary resources must be released to service another transfer. In either case, the performance of the transfer, and the execution of the process in the processor 11-1, are delayed until all of the necessary resources are available. More importantly, the processor 11-1 is totally blocked from executing any process. This is because, the processor 11-1 is necessary for initiating and controlling the transfer when all of the necessary resources become available.

Circumstances where the processor is blocked from executing process instructions should be avoided to maximize processor utilization. However, as indicated above, if the resources that are necessary for performing a transfer in order to execute a process instruction are not available, the processor must suspend execution of that instruction until those resources are available. Sometimes, the circumstances permit the processor to execute instructions of another available process. However, as indicated above, in the blocking scenario which arises during transfers between the processors 11-1 to 11-n and the I/O devices 22-1 to 22-m, the blocked processor cannot switch to executing another process.

The prior art has disclosed certain variations on the computer system architecture 10 of FIG. 1 for purposes of enhancing some aspect of the operation of the system 10. However none of these prior art references addresses the specific problem of processor blocking during transfers between a processor and an I/O device.

U.S. Pat. No. 5,142,672 discloses a system similar to FIG. 1 for insulating the performance of fast devices connected to a fast system bus from the performance of slow devices connected to a slow I/O expansion bus. In place of the I/O bridge 18, a data transfer controller is provided which supports both I/O ports and DMA channels for transferring data between high speed devices (processors, shared memory, etc.) connected to the system bus and low speed I/O devices connected to the I/O expansion bus. The data transfer controller therefore facilitates data transfer between high speed devices on the system bus and low speed I/O devices on the I/O expansion bus and permits transferring data in a fashion optimized for each I/O device. Nevertheless, all data transfers between the I/O devices and the high speed devices are achieved via the same data path including the fast system bus, the data transfer controller, and the slow I/O expansion bus.

U.S. Pat. No. 5,191,657 discloses a computer system architecture with a synchronous I/O expansion bus and at least one asynchronous system bus. For example, an architecture similar to that of FIG. 1 may be provided with an asynchronous system bus interconnecting the processors, shared memory, and cache memory. An asynchronous system bus to synchronous I/O expansion bus interface controller is provided in place of the I/O bridge. In another variation, the system bus and the I/O bus are both synchronous busses but each bus has a different clock frequency. The I/O bridge is omitted. Instead, the system bus and the I/O bus are connected together by an asynchronous bus (and associated controller). In any event, all data transfers between devices on the system bus and I/O devices are achieved via the same data path.

U.S. Pat. No. 5,212,776 discloses a computer system architecture which has no I/O expansion bus or I/O bridge. Rather, all I/O devices are connected via their own respective controllers to the system bus. The system bus itself does not have separate signal lines for conveying data and addresses. Rather, both data and addresses are transferred via twenty-four signal lines. This particular patent addresses the problem of transferring addresses to a large memory wherein the memory addresses have a precision which is higher than the number of bits which can be transferred in parallel via the system bus. A separate physical address bus is provided between the processor and the memory. The physical address bus serves as an auxiliary bus which may be used by the processor for accessing the memory (in addition to the system bus which may be used by both the processor and the I/O devices). However, the I/O devices can use only the system bus for transferring data. Thus, the processor has two data paths for accessing the memory. All other data transfers (i.e., between the processor and an I/O device, between the memory and an I/O device, etc.) are achieved via the same data path including the system bus.

An object of the present invention therefore is to reduce the occurrence of circumstances under which a processor is entirely blocked from execution. It is a particular object of the present invention to reduce the likelihood of blocking which arises during transfers between a processor and an I/O device.

SUMMARY OF THE INVENTION

These and other objects are achieved by the present invention. Studies have revealed that the aforementioned blocking scenario which occurs during transfers between the processor and I/O device arises because of over-utilization of the I/O expansion bus. In particular, a transfer between a processor and an I/O device is typically blocked by a transfer between an I/O device and the shared memory because the latter utilizes a large portion of the bandwidth of the I/O expansion bus. The processor-I/O device transfer is typically a small transfer, i.e., several bytes whereas the I/O device-shared memory transfer is typically a large transfer, i.e., hundreds, thousands, or even megabytes. Furthermore, the trend is for the I/O device-shared memory type of transfer to grow to occupy the bulk of the bandwidth of the I/O expansion bus, despite any increases in that bandwidth while the processor-I/O device type of transfer is not expected to increase much at all.

According to one embodiment, a computer system is provided with a processor, a memory, an I/O device, and a second data path. The first data path includes a first bus for transferring data between the I/O device and the memory. The second data path includes a transfer interconnection for transferring data between the processor and the I/O device. The transfer interconnection is illustratively a second bus, although it can be virtually any type of interconnection such as a ring connection. The I/O device is illustratively modified so that it can connect to, and transfer data via, both the first bus and the transfer interconnection. Such an I/O device is referred to herein as a non-blocking I/O device.

Illustratively, the computer system includes a system bus interconnecting the processor and memory and an I/O bridge interconnecting the system bus to the first bus and the transfer interconnection. In such a case, the first path illustratively includes the system bus, the I/O bridge, and the first bus, and the second path illustratively includes the system bus, the I/O bridge, and the transfer interconnection. The I/O bridge is illustratively adapted to accommodate both types of transfers to both non-blocking I/O devices and ordinary I/O devices which ordinary I/O devices are only connected to the first bus. To that end, the I/O bridge is illustratively provided with dispatch control logic for receiving transferred data and commands from the system bus and for determining if the received data or commands must be transferred via the first bus or via the transfer interconnection.

The processor may transfer a command to the I/O bridge indicating that future transfers to specified non-blocking I/O devices should be completed via the second path (including the transfer interconnection) and that all other transfers (to ordinary I/O devices) should be completed via the first path (including the I/O expansion bus). Alternatively, the I/O bridge may determine which of the I/O devices are non-blocking I/O devices and which are ordinary I/O devices using a novel polling procedure. According to this polling procedure, the I/O bridge performs the following steps for each device:

(1) the I/O bridge polls the I/O device via the first bus by transferring thereon a command including an indication for that I/O device, and (2) if the I/O device does not respond, the I/O bridge polls the I/O device via the transfer interconnection by transferring thereon a command including an indication for that device.

Illustratively, ordinary I/O devices respond to the first step of polling. However, non-blocking I/O devices do not respond to the first step of polling. Rather, they are adapted to respond only to the second step of polling. Based on these responses, the I/O bridge determines which devices are non-blocking I/O devices and which are ordinary I/O devices. Illustratively, the I/O bridge is provided with one or more registers for storing indications regarding which I/O devices are non-blocking I/O devices and which are ordinary I/O devices.

In short, a novel computer system architecture is provided with a first data path for effecting transfers between the I/O devices and the memory, and a second data path for effecting transfers between the processor and the I/O devices. Simply stated, a separate path is provided for bypassing a frequently demanded resource, namely, the I/O expansion bus, for performing those transfers which would otherwise be subject to frequent delays that can entirely block processor execution. Such an architecture provides numerous advantages including:

(1) the architecture and method of operation are simple, (2) both enhanced non-blocking I/O devices and ordinary I/O devices are supported, (3) the solution works independently of the continued trend of increased utilization of the I/O expansion bus by the I/O devices, and (4) the necessary integrated circuits for implementing the invention can be provided with reasonably low pin-out count requirements.

BRIEF DESCRIPTION OF THE DRAWINGS

FIGS. 5–10 are timing diagrams illustrating transfers on the transfer interconnection (S-bus) 130 and I/O expansion bus (M-bus) 120 according to the present invention.

DETAILED DESCRIPTION OF THE DRAWINGS

Prior to reviewing the invention it is useful to compare the transfers between an I/O device and the shared memory and the transfers between a processor and the I/O device. Typically, transfers between an I/O device and the shared memory have the following characteristics:

(1) The transfers are of large blocks of data. For example, the smallest packet of data which is received by an ethernet network controller and network I/O device (and which must be transferred to or from the shared memory) contains sixty-four bytes.

(2) The transfers are sequential. For example, the I/O device transfers a sequence of data bytes for storage in corresponding sequentially adjacent addresses of the shared memory.

(3) The transfers consume almost all, i.e., over 90%, of the I/O transfer bandwidth of the I/O expansion bus.

(4) The transfers are subject to delays as a result of multiple devices (i.e., other I/O devices, cache memories, processors, etc.) also simultaneously attempting to access the I/O expansion bus or shared memory.

On the other hand, transfers between a processor and an I/O device typically have the following characteristics:

(1) The transfers are typically small, single accesses transferring up to about four bytes.

(2) There are relatively fewer transfers of this type in comparison to the transfers between the I/O device and the shared memory.

(3) The I/O devices act as slaves in each of these types of transfers; the transfers are entirely initiated and controlled by the processors.

These two types of transfers are radically different. Furthermore, the trend is for these two different types of transfers to diverge as more I/O devices utilize DMA and transfer larger bursts of data to and from the shared memory.

Figure 4:
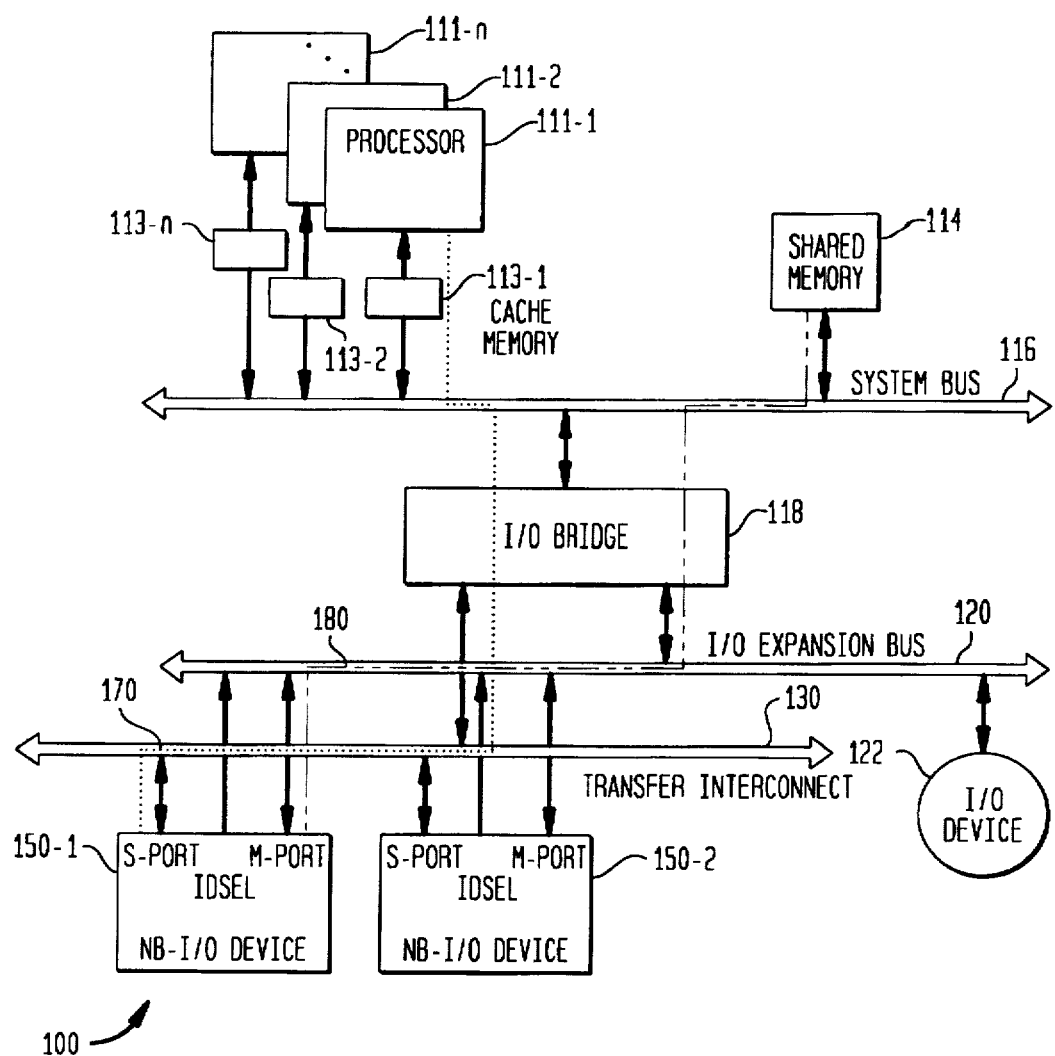
FIG. 4 shows a computer system according to the present invention.

Referring now to FIG. 4, a computer system 100 according to one embodiment of the present invention is shown.

Like the conventional computer system 10, the computer system 100 according to this embodiment has a plurality of processors 111-1, 111-2, . . . , 111-n, each CPU having a corresponding cache memory 113-1, 113-2, 113-n, a shared memory 114, and an I/O bridge 118 interconnected via a system bus 116. Furthermore, an I/O expansion bus 120 is connected to the I/O bridge 118 and one or more I/O devices 122 are connected to the I/O expansion bus 120. Illustratively, the I/O expansion bus 120 is a PCI I/O expansion bus (referred to herein as the master bus or "M bus"). Unlike the conventional computer system 10, the computer system 100 also has a S bus 130 connected to the I/O bridge 118. Illustratively, the S bus 130 is a second bus (referred to herein as the slave bus or "S bus"), such as an IEEE 1394 bus, although as discussed in greater detail below, this is only illustrative. Illustratively, the S bus 130 has thirteen signal lines (eight data lines and five control signal lines) and operates at a 50 MHz clock rate (using BTL or GTL technology). One or more non-blocking (NB) I/O devices 150-1 and 150-2 are provided which are connected to both the M bus 120 and the S bus 130. As shown, each NB I/O device 150-1 and 150-2 is provided with an S-port (slave port) which is connected to the S bus 130 and an M-port (master port) which is connected to the M bus 120.

The M bus 120 functions identically as described above for effecting both transfers between the ordinary I/O device 120 and the shared memory 114 and transfers between the processors 111-1 to 111-n and the ordinary I/O device 122. The data paths of such transfers are described above. However, the M bus 120 only effects the transfers between the NB I/O devices 150-1 and 150-2 and the shared memory 114. As shown, such transfers occur via a data path 180 which includes:

NB I/O device 150-1 or 150-2 M-port←→M bus 120←→I/O bridge 118←→system bus 116←→shared memory 114.

On the other hand, transfers between the processors 111-1 to 111-n and the NB I/O devices 150-1 and 150-2 are effected via the (transfer interconnection) S bus 130. As shown, such transfers occur via a data path 180 which includes:

NB I/O device 150-1 or 150-2 S-port←→(transfer interconnection) S bus 130←→I/O bridge 118←→system bus 116←→processor 111-1 or 111-2 or, . . . , or 111-n.

Referring now to the timing diagrams of FIGS. 5–8, the operation of the S bus now described by way of examples. Since the I/O devices 150-1 and 150-2 operate only as slaves, a simplified protocol may be utilized. Only five control signal lines are necessary which dramatically reduces the pin-out requirements of the I/O bridge 118 and the NB I/O devices 150-1 and 1 50-2. In FIGS. 5–8, certain signals are used which are defined as follows:

| | |
|---|---|
| SCLK | A clock signal used for synchronizing transfers on the S bus 130. |
| CS_DS | A strobe signal indicating that a command or data is currently transferred via signal AD<7:0>. |
| MIO_SEL | A signal indicating whether a command transferred from a processor is a configuration register access or an I/O space register access. The signal is also used by the NB I/O devices to acknowledge receipt of a command. |
| WR_ | A signal specifying either a read or write transfer is occurring. |
| AD<7:0> | An eight-bit signal for use in transferring addresses of commands or data. |
| PAR | A signal used in performing a parity check on the signal AD<7:0> for verifying the integrity of transferred data and addresses. |

In the examples of FIGS. 5–8, it is assumed that the transfers are thirty-two-bit addresses and corresponding other signals indicating the request to perform a read or write operation to specified I/O device registers or thirty-two-bit returned accessed data and corresponding control signals of a response. For sake of convenience, it is presumed below that the transfers occur between the processor 111-1 and the NB I/O device 150-1. It may be appreciated that the transfer may occur between any of the processors 111-1 to 111-n and any of the NB I/O devices 150-1 and 150-2.

Figure 5:
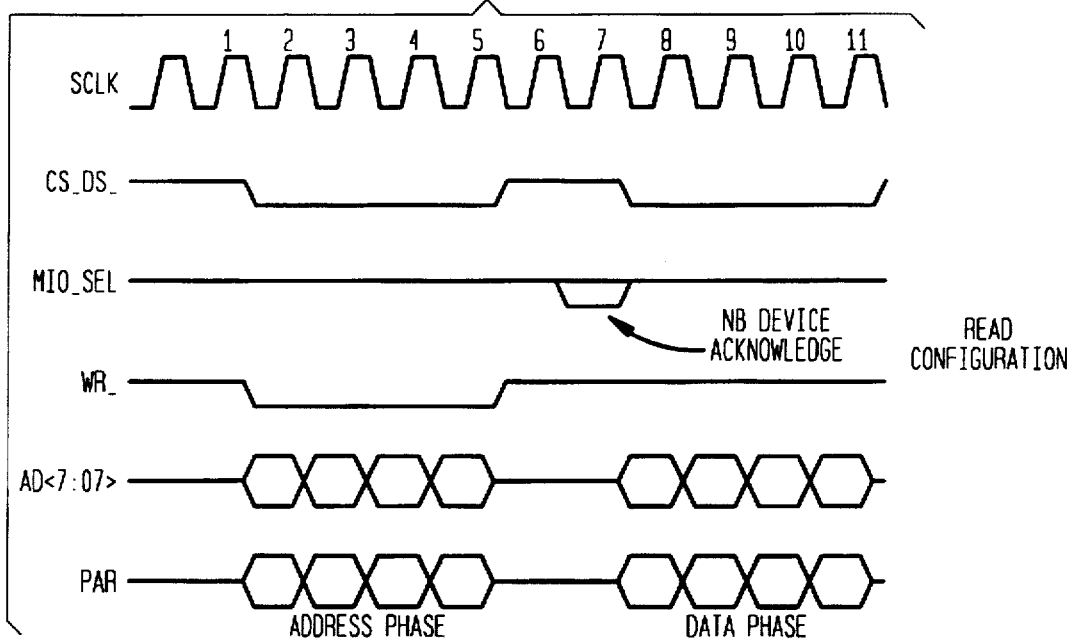

FIG. 5 illustrates a configuration read cycle. Prior to SCLK cycle two, the processor 111-1 issues a command to the I/O bridge 118 for transfer to the NB I/O device 150-1. On SCLK cycles two-five, the I/O bridge 118 transmits a low CS_DS signal indicating that a command is being transferred. In addition, the I/O bridge 118 transmits a low WR_signal indicating that the command is a read command. Also, the I/O bridge transmits a high MIO_SEL signal indicating that the transferred command is a configuration command and not an I/O space register command. Furthermore, the I/O bridge transmits an AD<7:0> signal indicative of the thirty-two-bit address associated with the configuration read command. Illustratively, the uppermost byte of the configuration read command address<31:24> is transmitted on SCLK cycle two, followed by the next highest byte of the configuration read command address<23:16> on SCLK cycle three, the next highest byte<15:8> on SCLK cycle four and the lowest byte<7:0> on SCLK cycle five. The I/O bridge 118 transmits an appropriate PAR signal on each SCLK cycle two-five corresponding to the AD<7:0> signal transmitted on that SCLK cycle.

In a similar fashion to the PCI I/O expansion bus described above, the configuration read address includes an indication of which NB I/O device 150-1 or 150-2 is the recipient of the command. That is, only a single bit of the two upper bytes<31:16> (transmitted via the AD<7:0> signal on SCLK cycles two and three) are set to a logic '1' value; the other bits are set to a logic '0' value. The particular bit which is set corresponds to the recipient NB I/O device, in this case, the I/O device 150-1. All NB I/O devices 150-1 and 150-2 monitor the transmissions on the S bus 130 for appropriate transmissions. In response to detecting the indication corresponding to the NB I/O device 150-1, the NB I/O device 150-1 responds by transmitting a low MIO_SEL signal on SCLK cycle seven. Then, on SCLK cycles eight-eleven, the NB I/O device 150-1 transmits a low CS_DS signal and an AD<7:0> signal indicating the data contained in the configuration register of the NB I/O device 150-1. Because, the configuration register is assumed to contain thirty-two-bits, each byte<31:24>, <23:16>, <15:8> and<7:0> of this thirty-two bit data is transmitted via the signal AD<7:0> on a respective one of the SCLK cycles eight, nine, ten, and eleven. Furthermore, the NB I/O device 150-1 transmits an appropriate parity signal on SCLK cycles eight-eleven corresponding to the signal AD<7:0>.

The I/O bridge 118 receives the MIO_SEL signal on SCLK cycle seven acknowledging receipt of the command. Furthermore, the I/O bridge 118 receives the data indicated in the signal AD<7:0> on SCLK cycles eight-eleven. Thereafter, the I/O bridge 118 transfers the received data to the processor 111-1 via the system bus 116.

Figure 6:
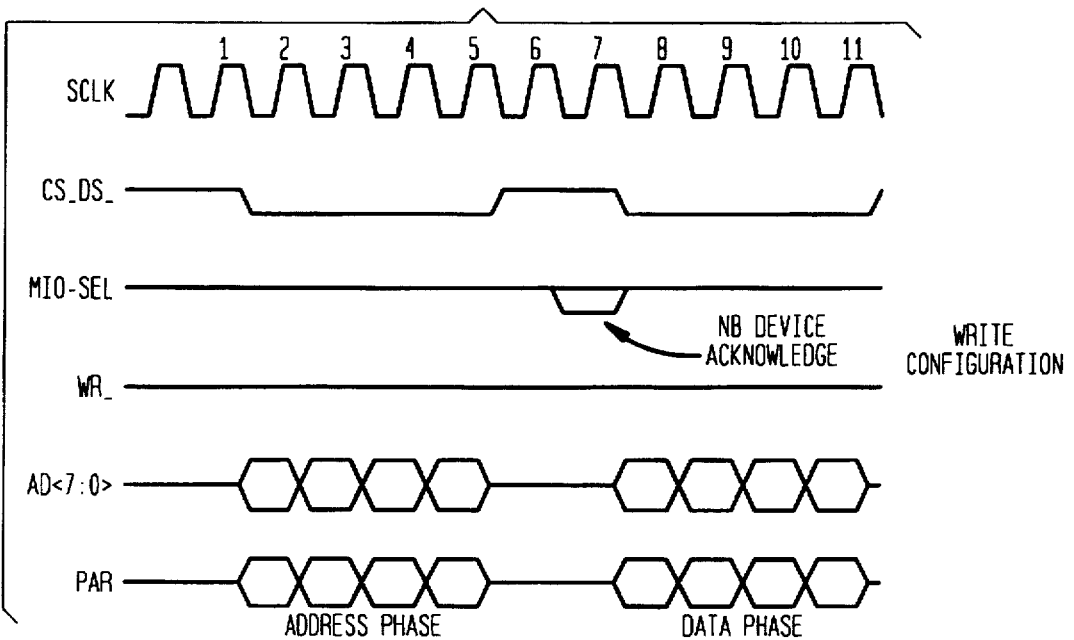

FIG. 6 illustrates a configuration write cycle. This operation is similar in many ways to the configuration read cycle of FIG. 5. Before SCLK cycle two, the processor 111-1 transfers the write configuration command to the I/O bridge. On SCLK cycles two-five, the I/O bridge transmits:

(1) a low CS_DS signal (indicating the transmission of a command), (2) a high MIO_SEL signal (indicating a configuration command), (3) a high WR_command (indicating a write command), (4) AD<7:0> containing the four bytes of the address of the write configuration command, and (5) an appropriate PAR signal for each AD<7:0> signal on the respective SCLK cycle.

In response, the NB I/O device transmits a low MIO_SEL signal on SCLK cycle seven.

Thereafter, the I/O bridge 118 transmits on SCLK cycles eight-eleven a low CS_DS signal indicating the transmission of data to be stored in the configuration register. Simultaneously, the I/O bridge 118 transmits the AD<7:0> signal containing the data to be stored in the configuration register of the NB I/O device 150-1. Again, since the configuration register is presumed to have a thirty-two-bit capacity, four SCLK cycles are required to transmit all of the bytes. Furthermore, the I/O bridge 118 transmits an appropriate PAR signal on SCLK cycles eight-eleven corresponding to the AD<7:0> signal transmitted on the same SCLK cycle.

FIG. 7 illustrates an I/O space read cycle which the processor 111-1 issues to read-out the contents of the I/O space register of the NB I/O device 150-1. FIG. 8 illustrates an I/O space write cycle which the processor 111-1 issues to write new data into the I/O space register of the NB I/O device 150-1. The I/O space read cycle is similar to the configuration read cycle illustrated in FIG. 5. Likewise, the I/O space write cycle is similar to the configuration write cycle of FIG. 6. The only difference is that the I/O bridge 118 transmits a low MIO_SEL signal, during SCLK cycles two-five for performing either the I/O space read or I/O space write cycle to indicate that the transmitted command is an I/O space command and not a configuration command.

As mentioned above, the I/O bridge 118 performs transfers between the processors 111-1 to 111-n and the NB I/O devices 150-1 to 150-2 using the path 170 and the S bus 130. However, the I/O bridge 118 performs transfers between the processors 111-1 to 111-n and the ordinary I/O devices 122 using the path 180 and the M bus 120. Illustratively, the processors 111-1 to 111-n preliminarily can issue a command to the I/O bridge 118 indicating which future transfers must be performed using the path 180 and which may be performed using the path 170 depending on the intended recipient I/O device 150-1, 150-2, or 122.

Figure 1:
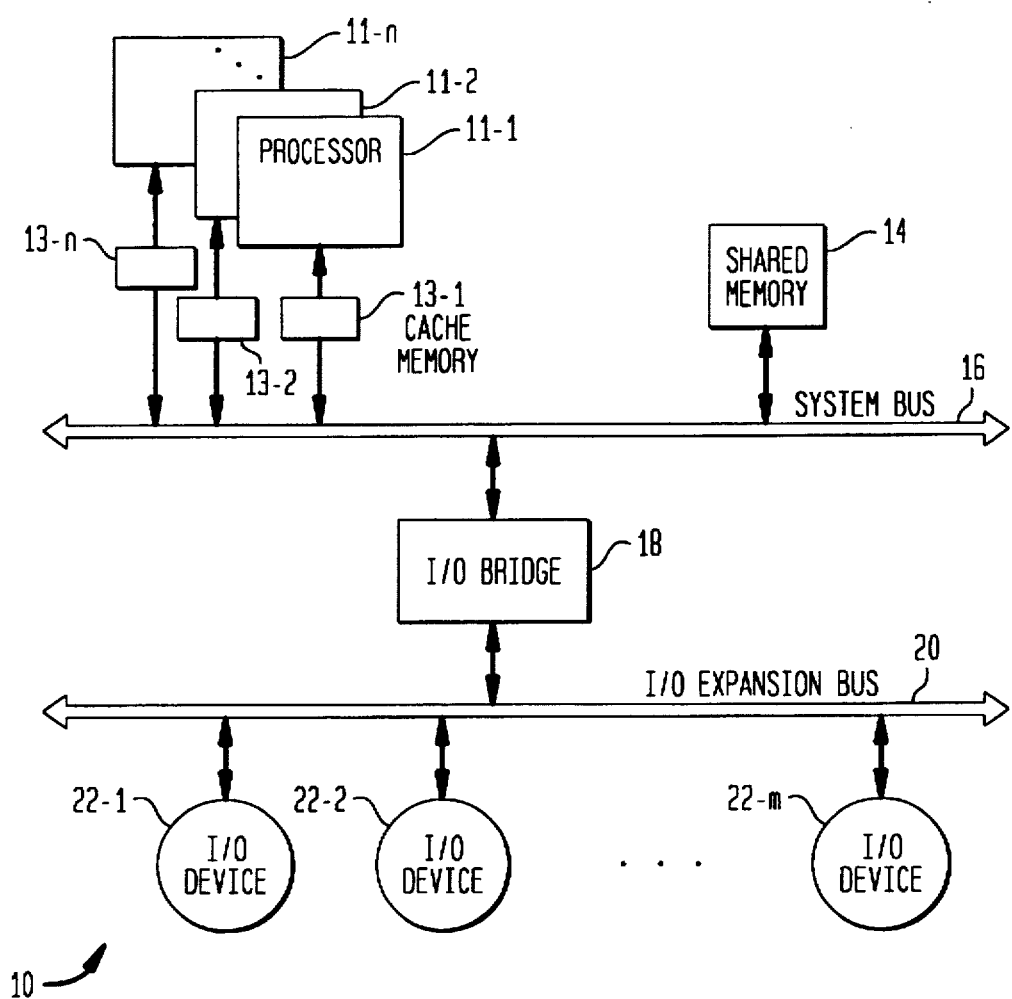
FIG. 1 shows a prior art computer system.
Figure 2:
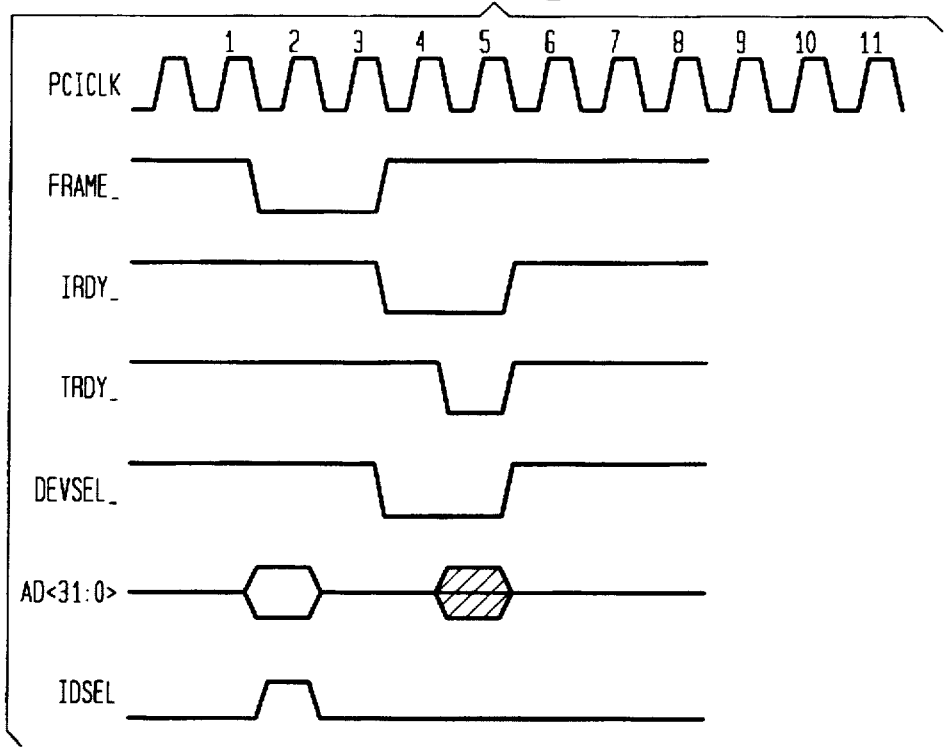
FIGS. 2–3 are timing diagrams illustrating prior art transfers on the I/O expansion bus 20 of the system 10 of FIG. 1.
Figure 3:
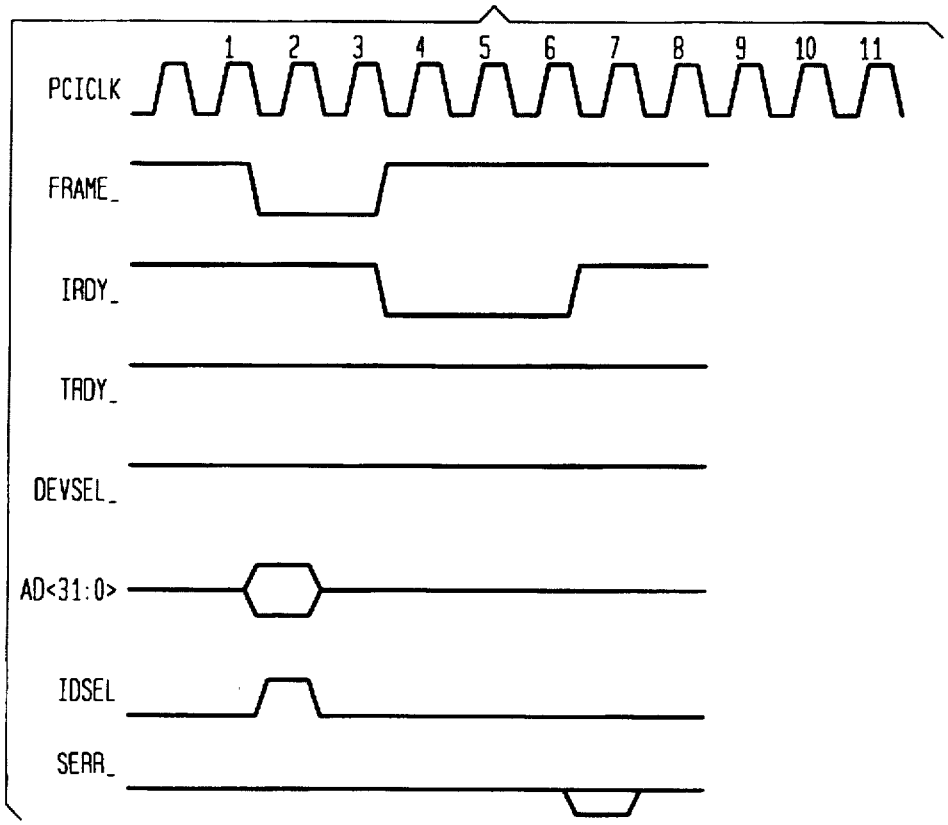
Figure 9:
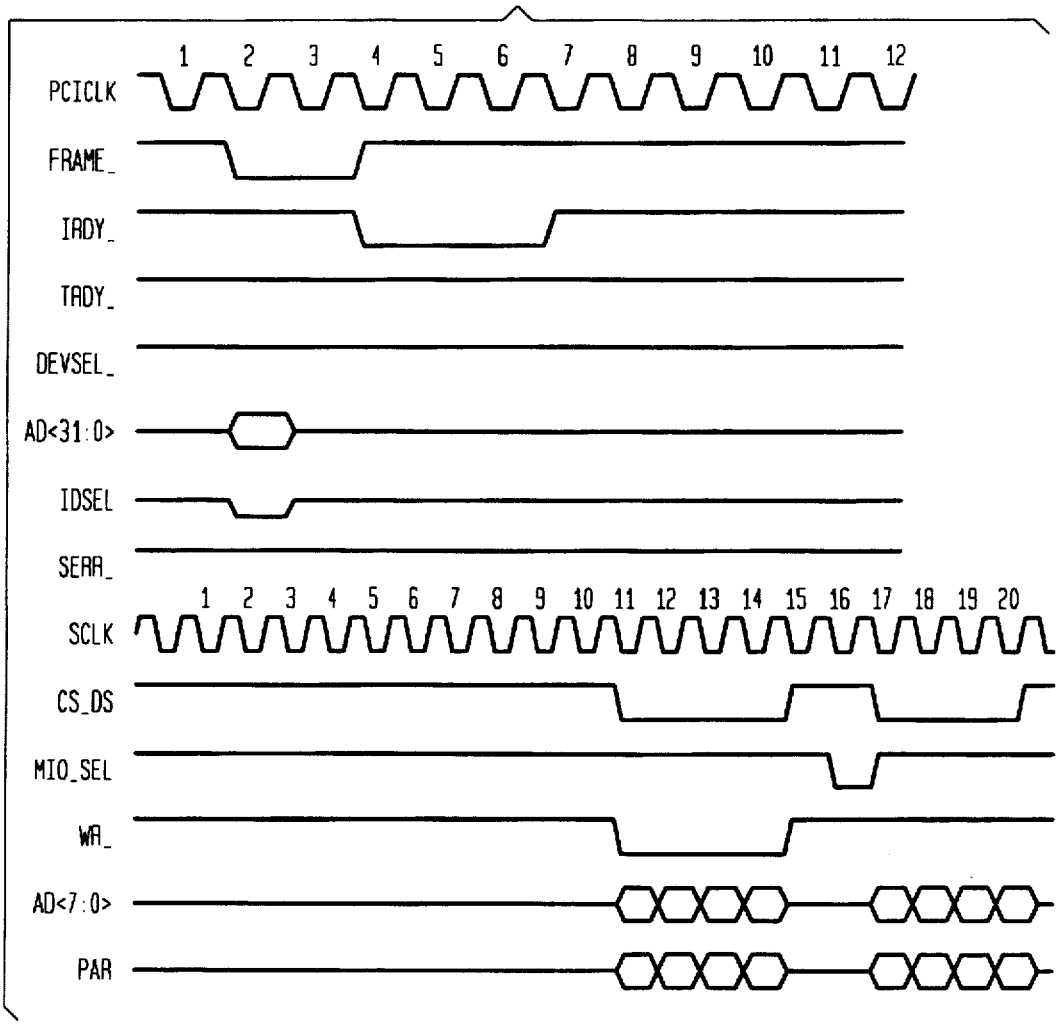
Figure 10:
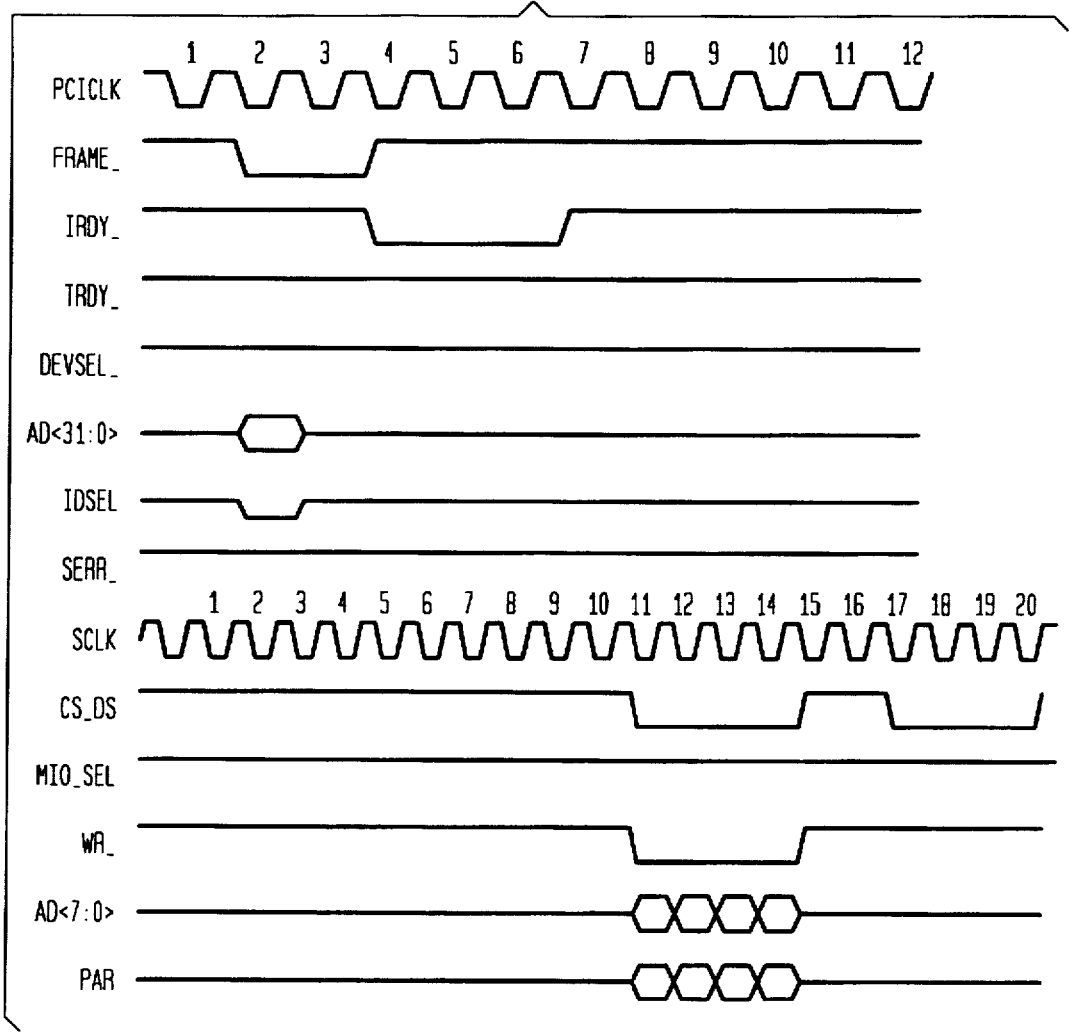

Alternatively, the I/O bridge 118 can determine whether each I/O device 150-1, 150-2, or 122, is non-blocking or ordinary as illustrated in FIGS. 2, 9, and 10. FIGS. 9 and 10 are timing diagrams illustrating an illustrative polling procedure wherein the signals transmitted on both the M bus 120 and the S bus 130 are shown in the same diagram. The procedure shown in FIGS. 2 or 9 is carried successively for each I/O device 150-1, 150-2, and 122. As shown in FIGS. 2 and 9, the I/O bridge 118 first polls the I/O device via the M bus 120 by performing a configuration read cycle for a particular I/O device. As mentioned above, a specific I/O device can be specified by setting the appropriate bit of the upper two bytes of AD<31:16> to a logic '1'. This process has been described above and is not repeated here. If the I/O device is an ordinary I/O device, such as the I/O device 122, the I/O device responds on PCICLK 20 cycle five as shown in FIG. 2. This causes the I/O bridge 118 to identify the polled I/O device 122 as an ordinary I/O device 122.

If, however, the polled I/O device is a NB I/O device, such as the I/O device 150-1, the I/O device does not respond. This is shown in FIG. 9. Unlike the prior art I/O bridge 18, the I/O bridge 118 does not transmit the signal SERR_ indicating an error. Rather, as shown on SCLK cycles eleven-fourteen, the I/O bridge 118 performs a configuration read cycle on the transfer interconnection. As shown, the NB I/O device 150-1 responds on SCLK cycle sixteen by transmitting a low MIO_SEL signal. This causes the I/O bridge 118 to identify the polled I/O device 150-1 as a non-blocking I/O device.

FIG. 10, is a timing diagram illustrating the signals transmitted by the I/O bridge 118 when no I/O device responds to polling via either the M bus 120 or the S bus 130. Such is the case if no I/O device is present corresponding to the indication used in the configuration read cycle. As shown, if the I/O bridge 118 does not receive the MIO_SEL signal on SCLK cycle sixteen, no AD<7:0> or PAR signals are transmitted on SCLK cycles seventeen-twenty.

Figure 11:
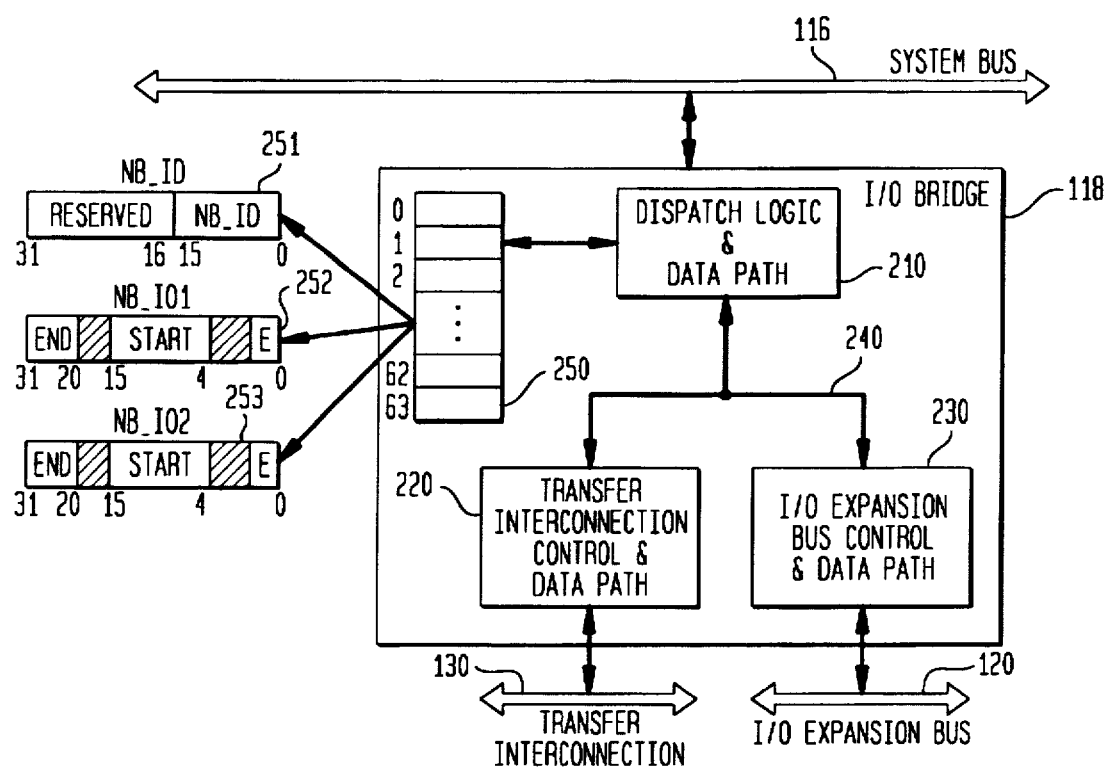
FIG. 11 shows an illustrative I/O bridge 118 according to the present invention in greater detail.

Referring now to FIG. 11, the internal architecture of the I/O bridge 118 is now described. As shown, the I/O bridge 118 illustratively has dispatch logic circuit 210, S bus control circuit 220 and M bus control circuit 230 interconnected by the internal bus 240. The dispatch logic 210 is connected to the system bus 116. The S bus control circuit 220 is connected to the S bus 130. The M bus control circuit 230 is connected to the M bus 120. The purpose of the S bus control circuit 230 is to effect transfers on the S bus 130 according to the above described timing diagrams. Likewise the purpose of the M bus control circuit 240 is to effect data transfers on the M bus 120 according to the above described timing diagrams. By virtue of these connections, data may be transferred through the I/O bridge 118 in the above described fashions. In particular, the S bus control circuit 220 is part of the data path 170 and the M bus control circuit 230 is part of the data path 180. The dispatch logic 210 and internal bus 240 are part of both data paths 170 and 180.

The purpose of the dispatch logic 210, among other things, is to determine via which data path, to transfer a command received from a processor 111-1 to 111-n. To assist in this task, the dispatch logic circuit 210 is connected to a set of internal registers 250. Using information contained in these registers 250, the dispatch logic 210 can determine on which of the S bus 130 or the M bus 120 to transfer a command received from a processor 111-1 to 111-n. For example, one of the registers, i.e., the NB_IO register 251 is assigned to storing an appropriate indication for each I/O device 150-1, 150-2, and 122 as to whether the I/O device is a NB I/O device or an ordinary I/O device. Illustratively, the lower two bytes NB_ID<15:0> include one bit position corresponding to each possible I/O device 150-1, 150-2, and 122 which can be connected to the I/O bridge 118 via the M bus 120 or S bus 130. If an I/O device is a non-blocking I/O device, an indication, e.g., the logic '1' bit value, is stored in the bit position of the lower two bytes NB_IO<15:0> of the NB_ID register 251 corresponding thereto. Otherwise, a different indication, e.g., the logic '0' bit value, is stored in the corresponding bit position of the lower two bytes NB_IO <15:0>. Illustratively, each bit may be set in response to an appropriate command issued by a processor 111-1 to 111-n to the I/O bridge 118, or by the I/O bridge 118 itself as a result of the above-mentioned polling procedure.

When a transfer command is received at the I/O bridge 118, the command is received at the dispatch logic 210. If the transfer command is for performing a processor-I/O device configuration access, the dispatch logic 210 first extracts the two bytes AD<31:16> of the address AD<31:0> of the received command which contain the identification of the I/O device which is to receive the command. Then, the dispatch logic 210 retrieves the contents of the lower two bytes NB_IO<15:0> of the NB_IO register 251. The dispatch logic 210 then illustratively determines if the I/O device to which the command is to be transferred is a NB I/O device by simply logically ANDing NB_IO<15:0> and AD<31:16>. This is possible assuming that the bit positions of both NB<15:0> and AD<31:16> have the same one-to-one correspondence with the identifiers of the I/O devices (i.e., the least significant bit NB_IO<0> and AD<16> correspond to the same first I/O device, the next least significant bit NB_IO<1> and AD<17> correspond to the same second I/O device, etc.). In such a case, if the result of the AND operation contains only logic '0' bit values, then the I/O device to which the command is to be transferred must be an ordinary I/O device. In this event, the dispatch logic 210 transfers the command to the M bus control circuit 230 which transfers the command to the I/O device, e.g., the I/O device 122, via the M bus 120. On the other hand, if the result of the AND operation contains a logic '1' bit value, then the I/O device which receives the command must be a NB I/O device. In this event, the dispatch logic 210 transfers the command to the S bus control circuit 220 which transfers the command to the I/O device, e.g., the I/O device 150-2, via the S bus 130.

As mentioned above, the memory mapped area and I/O mapped area of any PCI I/O device may be relocated by simply writing the new address locations in the appropriate register of the I/O device. This feature is utilized by the processors 111-1 to 111-n while executing configuration software for purposes of relocating certain response spaces belonging to that I/O device. While executing the configuration software, a processor, e.g., the processor 111-1, reads the relocation register of each I/O device 150-1, 150-2, and 122. The processor 111-1 then reads out the contents of the NB_IO register 251 (which already includes indications of which devices are NB I/O devices and which are not). For each I/O device determined (from the NB_IO register 251) to be a NB I/O device, the processor 111-1 concatenates all these response spaces into one continuous space and relocates that continuous space of the I/O devices by performing a write to the NB_IO1 or NB_IO2 register of the I/O bridge. This is necessary to simplify the logic required to identify a processor to I/O device access from the system bus and should be directed to the M-bus or the S-bus. This is also achieved by performing a configuration write cycle to the relocation register of each corresponding I/O device. In relocating the I/O spaces of each NB I/O device, the processor 111-1 can consolidate the I/O spaces into one contiguous area of the I/O space. Illustratively, the I/O bridge 118 includes at least one register NB_IO1 252 and NB_IO2 253 for storing the start and end addresses of such a contiguous space. In such a case, the processor 111-1 issues a command to the I/O bridge 118 for storing the start and end addresses in the appropriate start and end address locations of the NB_IO1 register 252 or NB_102 register 253.

The registers NB_IO1 252 and NB_IO2 252 assist the dispatch logic 210 in determining by which path 170 or 180 to transfer a received I/O command. Whenever the I/O bridge 118 receives a command for accessing the I/O space of an I/O device, the dispatch logic 210 retrieves the start and end addresses from the appropriate register NB_IO1 register 251 or NB_IO2 register 253. If the address of the command is between the start and end addresses, then the command is for accessing the I/O space of a NB I/O device 150-1 or 150-2. In such a case, the dispatch logic 210 transfers the command to the S bus control circuit 220. Otherwise, if the address of the command is outside the start and end addresses, then it must be for accessing an ordinary I/O device. In this case, the dispatch logic 210 transfers the command to the M bus control circuit 230.

Figure 12:
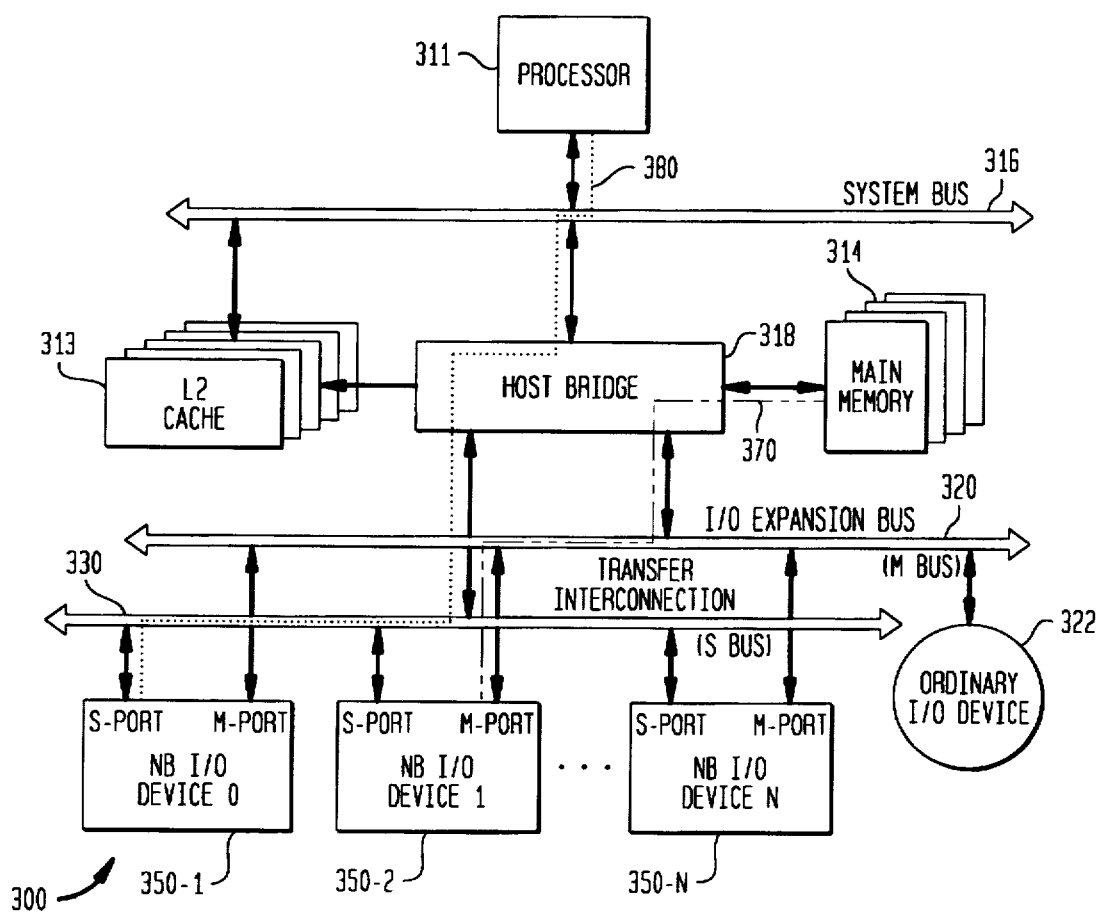
FIGS. 12–13 show alternative computer systems with a single processor according the present invention.

The invention has been illustrated above in a multiprocessor computer system 100. However, the invention is equally applicable in a single processor computer system architecture. FIG. 12 shows one such computer system 300. This computer system has only a single multi-tasking processor 311 connected to a system bus 316. A second level (L2) cache memory 313 is provided which is connected to the system bus 316. The I/O bridge is replaced with a more general host bridge 318 which is connected to the system bus 316. The host bridge is connected to the cache memory 313 and to a main memory 314. An ordinary I/O device 322 is connected via an I/O expansion bus or M bus 320 to the host bridge 318. N NB I/O devices 350-1, 350-2, . . . , 350-N are connected to the host bridge 318 via a transfer interconnection 330, such as an S bus, and the M bus 320. As shown, a first data path 370 is provided between the main memory 314 and the NB I/O devices 350-1, 350-2, . . . , 350-N which is as follows:

NB I/O devices 350-1, 350-2, . . . , 350-N M-port (I/O expansion bus 320) M bus 320←—→host bridge 318←—→main memory 314.

Furthermore, a second data path 380 is provided between the processor 311 and the NB I/O devices 350-1, 350-2, . . . , 350-N as follows:

NB I/O devices 350-1, 350-2, . . . , 350-N S-port←—→ (transfer 10 interconnection) S bus 330←—→host bridge 318←—→processor 311. Illustratively, the host bridge 318 may be modified by including dispatch logic 210, S bus control circuit 220, M bus control circuit 230, an internal bus 240, etc., for performing the transfer via the appropriate path 370 or 380.

Figure 13:
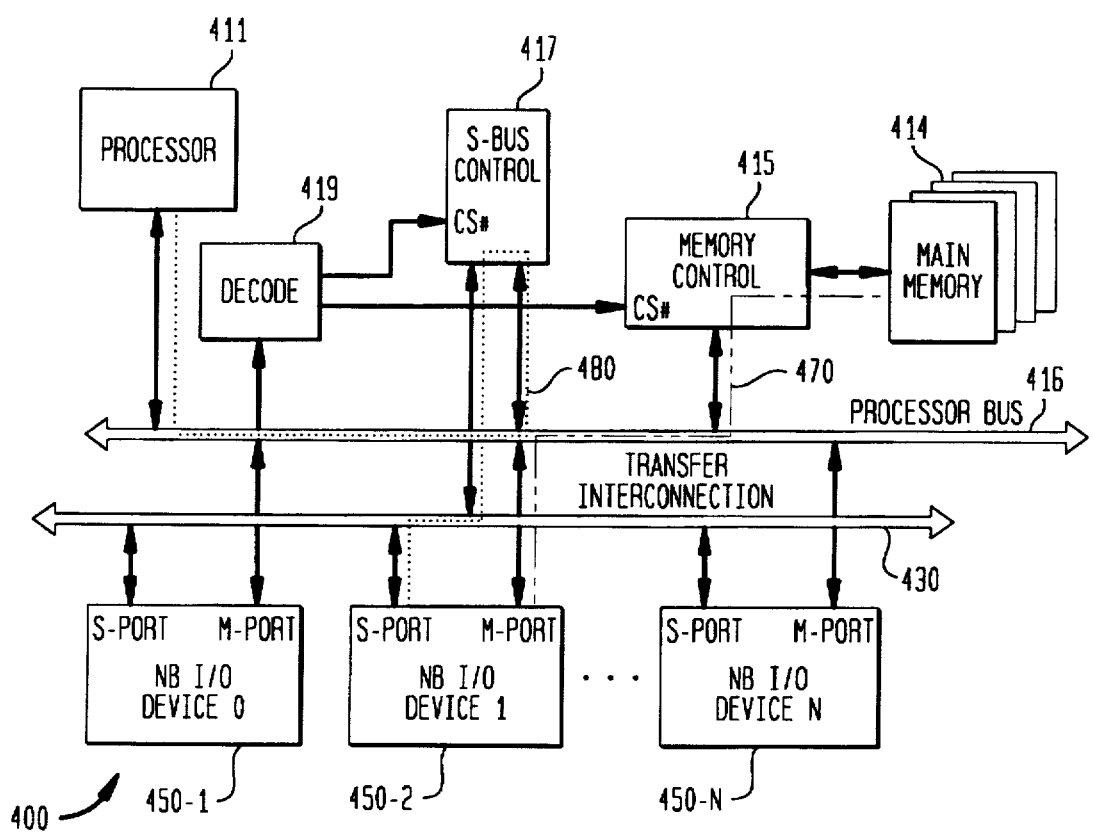

FIG. 13 shows yet another single processor computer system 400. The computer system 400 has a multi-tasking processor 411, a main memory 414, and a memory controller 415 for controlling access to the main memory 414. The computer system 400 does not have separate system and I/O expansion busses. Rather, the computer system 400 has a single processor bus 416. A decoder 419 is provided for monitoring the signals transmitted on the processor bus 416 and for generating a CS# (command strobe) signal whenever a command is generated on the processor bus 416. The CS# signal is received at the memory controller 415 and is used to control the access thereto.

The NB I/O devices 450-1, 450-2, . . . , 450-N have their respective M-ports connected to the processor bus 416. (Illustratively, no ordinary I/O devices are provided, although this is only illustrative. Such I/O devices would simply be connected to the processor bus 416.) Furthermore, a transfer interconnection 430, in the form of an S bus, is provided to which the S-ports of the NB I/O devices 450-1, 450-2, . . . , 450-N are connected. In order to connect the S bus 430 to the rest of the computer system 400, an S bus controller 417 is provided which is connected to the S bus 430 and the system bus 416. The S bus controller 417 also receives the CS# signal from the decoder 419. In this fashion, the S bus controller 417 can intercept commands on the processor bus 416 for effecting a transfer between the processor 411 and a NB I/O device 450-1, 450-2, . . . , or 450-N. Upon intercepting such a command, the S bus controller transmits the command on the S bus 430. The S bus controller 417 also receives the responses from the NB I/O devices and transmits them on the processor bus 416 to the processor 411.

Two data paths 470 and 480 are provided for effecting transfers. The first path 470 is as follows:

NB I/O device 450-1, 450-2, . . . , 450-N M-port←—→processor bus 416←—→memory controller 415←—→main memory 414.

The second path 480 is as follows:

NB I/O device 450-1, 450-2, . . . , 450-N S-port←—→ (transfer interconnection) S bus 430←—→S bus controller 417←—→processor bus 416←—→processor 411.

Figure 14:
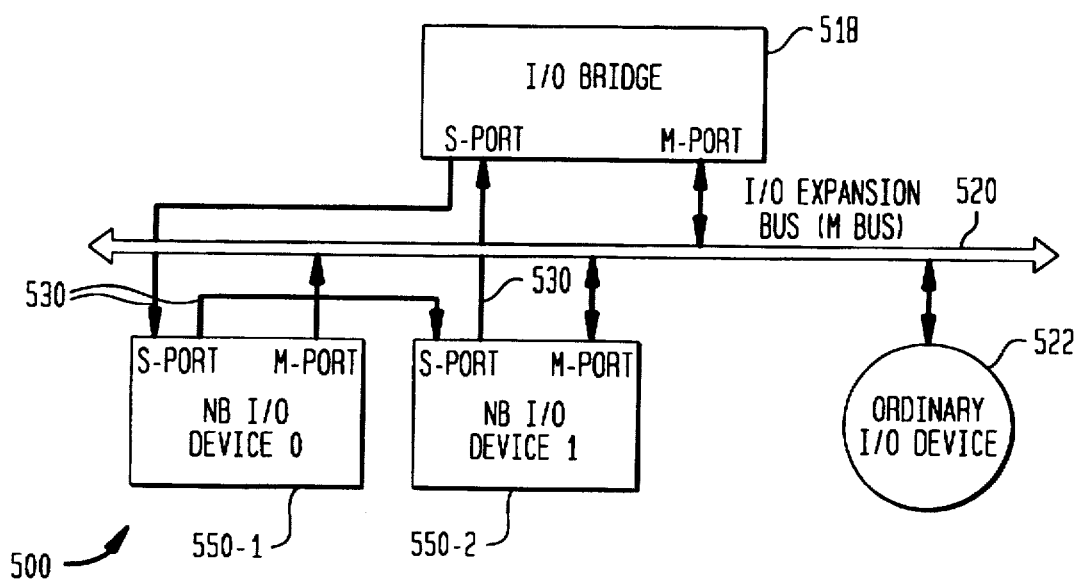
FIG. 14 shows an alternative implementation of the transfer interconnection according to the present invention.

As mentioned above, the transfer interconnection need not be implemented as a bus but could be implemented as any kind of connection which can convey the appropriate signals amongst the S-ports of all NB I/O devices. FIG. 14 shows a computer system with an alternative transfer interconnection 530. For purposes of brevity, only the I/O bridge 518, I/O expansion bus (M bus) 520, I/O devices 522, 550-1, 550-2 and transfer interconnection 530 are shown. As before, the ordinary I/O device 522 is connected to only the M bus 520. The NB I/O devices 550-1 and 550-2 also have their M-ports connected to the M bus 520. Unlike before, the transfer interconnection 530 is not in the form of an S bus but rather takes the form of a ring. That is, the S-ports of the I/O bridge 518 and the NB I/O devices 550-1 and 550-2 each have an input and an output. A connection is made from the S-port output of the I/O bridge 518 to the S-port input of the NB I/O device 550-1, from the S-port output of the NB I/O device 550-1 to the S-port input of the NB I/O device 550-2 and from the S-port output of the NB I/O device 550-2 to the input S-port of the I/O bridge 518. It may be appreciated that any number of NB I/O devices can be interconnected in such a ring fashion.

In summary, a computer system is provided which has a master, such as a processor, a memory, an I/O device, a first transfer path, which includes a bus, and a second transfer path, which includes a transfer interconnection. Transfers between the memory and the I/O device are effected via the first path while transfers between the processor and the I/O device are transferred via the second path. The disparate treatment between these two types of transfers reduces the likelihood of delays for transfers between the processor and I/O device thereby reducing the likelihood of total process execution blocking of the processor.

Finally, the invention has been described above with reference to specific embodiments. However, this was only for purposes of illustrating the invention. Numerous alternative embodiments may be devised by those having ordinary skill in the art without departing from the spirit and scope of the following claims.

The claimed invention is:

1. In a computer system comprising a master, a memory, an I/O expansion bus, an I/O transfer interconnection not connected to the expansion bus, an I/O device connected to the I/O expansion bus and the I/O transfer interconnection, and a register configured to indicate one of said I/O expansion bus and said I/O transfer interconnection for transfers between said master and said I/O device, a transfer process comprising the steps of:

(a) selecting the I/O device to the I/O expansion bus for performing a transfer on a first path between said I/O device and said memory; and (b) selecting the I/O device to the one of said I/O expansion bus and said I/O transfer interconnection in accordance with said register for performing a transfer between said master and said I/O device.

2. A process for transferring data via one of first and second data paths, said first data path including an I/O expansion bus, and said second data path bypassing said I/O expansion bus via a transfer interconnection, said process comprising the steps of:

(a) storing in a register an indication whether said transfer interconnection supports transfers between said master and said I/O device;

(b) if said transfer is between a memory and said I/O device, then performing said transfer via said first path; and (c) if said transfer is between a master and said I/O device, performing said transfer via said one of first and second data paths in accordance with said indication in said register.

3. The process of claim 1, wherein transfers via said second path are initiated by only said master.

4. The process of claim 1, further comprising the step of writing, from said master to a storage location of said register, which storage location corresponds to said I/O device, an indication that said transfer interconnection supports transfers between said master and said I/O device.

5. The process of claim 1, further comprising, for each I/O device, the steps of:

(a) polling said I/O device, via said first path, and (b) in response to said I/O device failing to respond in said step of polling via said first path, polling said I/O device via said second path.

6. The process of claim 5, further comprising the step of, in response to said I/O device responding to said step of polling via said second path, writing in a storage location of said register, which storage location corresponds to said I/O device, an indication that said second path supports transfers between said master and said I/O device.

7. The process of claim 1, wherein said step of transferring via said second path further comprises the step of transmitting an MIO_SEL signal indicating a particular one of two types of registers in said I/O device to be accessed transfer via said second path.

8. The process of claim 1, further comprising the step of after said step of transferring via said second path, transmitting an MIO_SEL signal indicating that said transfer via said second path was successful.

9. The process of claim 5, further comprising, for each I/O device, the step of: in response to said polling via said second path, transmitting said MIO_SEL signal.

10. The process of claim 1, wherein a likelihood of processing delay in said master, by transfers via said I/O expansion bus is decreased.

11. A computer system, comprising:

(a) a master, (b) a memory, (c) an I/O device, (d) a register configured to store an indication whether said transfer interconnection supports transfers between said master and said I/O device, (e) a first data path, including a first bus connected to said I/O device, for performing transfers between said memory and said I/O device and for performing transfers between said master and said I/O device if said indication is that said transfer interconnection fails to support transfers between said master and said I/O device, and (f) a second data path, including a transfer interconnection connected to said I/O device, for performing transfers between said master and said I/O device if said indication is that said transfer interconnection supports transfers between said master and said I/O device, said second data path not including the first bus.

12. The computer system of claim 11, wherein said transfer interconnection is a second bus.

13. The computer system of claim 12, wherein said second bus comprises:

(a) a plurality of lines for transferring address and data bits of commands and responses, and (b) a register select line for transferring an indication specifying that said transfer via said plurality of lines accesses either a configuration register or an I/O space register of said I/O device.

14. The computer system of claim 11, further comprising:

(a) a system bus interconnecting said master and said shared memory, and (b) an I/O bridge connected to said system bus and to both said first bus and said transfer interconnection, (c) wherein said first path further comprises said system bus and said I/O bridge and wherein said second path further comprises said system bus and said I/O bridge.

15. The computer system of claim 11, wherein said transfer interconnection is a ring connection.

16. The process of claim 2, wherein transfers via said second path are initiated by only said master.

17. The process of claim 2, wherein the step of storing said indication further comprises the step of writing said indication from said master to a storage location of said register, which storage location corresponds to said I/O device.

18. The process of claim 2, wherein said step of storing said indication further comprises, for each I/O device, the steps of:

(a) polling said I/O device, via said first path, and (b) in response to said I/O device failing to respond in said step of polling via said first path, polling said I/O device via said second path.

19. The process of claim 18, wherein the step of storing said indication further comprises the step of, in response to said I/O device responding to said step of polling via said second path, writing said indication to a storage location of said register, which storage location corresponds to said I/O device.

20. The process of claim 2, wherein said step of transferring via said second path further comprises the step of transmitting an MIO_SEL signal indicating a particular one of two types of registers in said I/O device to be accessed transfer via said second path.

21. The process of claim 2, further comprising the step of after transferring data via said second path, transmitting an MIO_SEL signal indicating that said transfer via said second path was successful.

22. The process of claim 18, further comprising, for each I/O device, the step of: in response to said polling via said second path, transmitting said MIO_SEL signal.

23. The process of claim 2, wherein a likelihood of processing delay in said master, by transfers via said I/O expansion bus is decreased.

24. The computer system of claim 11, wherein the computer comprises a plurality of I/O devices, at least one I/O device being a non-blocking I/O device and at least one I/O device being a conventional I/O device and wherein each non-blocking I/O device is connected to the first and second data paths and each conventional I/O device is connected only to the first data path.

* * * * *